(12) United States Patent
L'Heureux et al.

(10) Patent No.: US 8,850,398 B1
(45) Date of Patent: Sep. 30, 2014

(54) AUTOMATED TESTING OF APPLICATION PROGRAMS FROM AN APPLICATION PROGRAM ECOSYSTEM

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 174 days.

(21) Appl. No.: 13/092,968

(22) Filed: Apr. 24, 2011

(51) Int. Cl.
G06F 9/44 (2006.01)
G06F 17/50 (2006.01)

(52) U.S. Cl.
USPC .......................................... 717/124; 705/7.25

(58) Field of Classification Search
None
See application file for complete search history.

(56) References Cited

U.S. PATENT DOCUMENTS

| | | | |
|---|---|---|---|
| 6,701,514 B1 * | 3/2004 | Haswell et al. | 717/115 |
| 6,862,696 B1 * | 3/2005 | Voas et al. | 714/38.11 |
| 7,315,826 B1 * | 1/2008 | Guheen et al. | 705/7.29 |
| 7,813,831 B2 * | 10/2010 | McCoy et al. | 700/198 |
| 7,930,681 B2 * | 4/2011 | Kloeffer et al. | 717/120 |
| 8,001,531 B1 * | 8/2011 | Rideout et al. | 717/124 |
| 2004/0030676 A1 * | 2/2004 | Wagner | 707/607 |
| 2006/0178918 A1 * | 8/2006 | Mikurak | 705/7 |
| 2007/0240118 A1 * | 10/2007 | Keren | 717/124 |
| 2009/0133000 A1 * | 5/2009 | Sweis et al. | 717/124 |
| 2010/0125832 A1 * | 5/2010 | Prasad et al. | 717/124 |
| 2010/0192220 A1 * | 7/2010 | Heizmann et al. | 726/19 |
| 2010/0318970 A1 * | 12/2010 | Grechanik et al. | 717/124 |
| 2011/0060945 A1 * | 3/2011 | Leprince et al. | 714/25 |
| 2011/0276945 A1 * | 11/2011 | Chasman et al. | 717/124 |

\* cited by examiner

*Primary Examiner* — Don Wong
*Assistant Examiner* — Mohammad Kabir
(74) *Attorney, Agent, or Firm* — Michael J. Andri (57) ABSTRACT

Implementations for automated testing of application programs from an application program ecosystem are disclosed. As one example, a server system is disclosed that includes an application program management service residing at and executable by the server system. The application program management service may be configured to identify one or more networked components of a target application program of a plurality of application programs accessible by clients at an application program data store via a communication network. The application program management service may be configured to test the one or more networked components of the target application program, and output an indication of a result of the test of the target application program.

16 Claims, 5 Drawing Sheets

| DESCRIPTION | HEALTH VALUE | | 600 |
|---|---|---|---|
| APPLICATION PROGRAM A | 10 OF 10 | PURCHASE | |
| APPLICATION PROGRAM B | 9 OF 10 | PURCHASE | |
| APPLICATION PROGRAM C | 7 OF 10 | PURCHASE | |
| APPLICATION PROGRAM D | 5 OF 10 | PURCHASE | |
| APPLICATION PROGRAM E | 4 OF 10 | PURCHASE | |

☐ SHOW EXCLUDED APPLICATION PROGRAMS HAVING HEALTH VALUES BELOW 4 OF 10

FILTER SETTINGS:  — 610

☑ BY DESCENDING HEALH VALUE

☐ BY ASCENDING HEALTH VALUE

☐ BY DESCRIPTION (ALPHABETICAL)

FIG. 6

AUTOMATED TESTING OF APPLICATION PROGRAMS FROM AN APPLICATION PROGRAM ECOSYSTEM

BACKGROUND

Computer software in the form of application programs may be distributed to consumers through online storefronts or libraries that are accessible by consumers via communication networks such as the Internet. Some application programs request data from information services that run on remote servers to provide functionality. However, these application programs may suffer degraded operation if these information services are no longer responsive to the application programs or no longer provide suitable responses to requests made by the application programs. For example, a software developer may discontinue support for an application program some time after the application program has been made available to consumers through online storefronts or libraries. Following such discontinuation of support, consumers that have purchased these application programs, may find that the application programs suffer from degraded operation. Further, other consumers may unknowingly purchase an application for which support has been discontinued, only to find that it does not work properly.

SUMMARY

Implementations for automated testing of application programs from an application program ecosystem are disclosed. As one example, a server system is disclosed that includes an application program management service executed at the server system. The application program management service may be configured to identify one or more networked components of a target application program of a plurality of application programs accessible at an application program data store by clients via a communication network. The application program management service may be configured to test the one or more networked components of the target application program, and output an indication of a result of the test of the target application program. Claimed subject matter, however, is not limited by this summary as other implementations may be disclosed by the following written description and associated drawings.

DETAILED DESCRIPTION

Automated testing of application programs from an application program ecosystem is disclosed in a variety of contexts. An application program management service of a server system may evaluate the health of application programs of an application program data store. The application program data store may be exposed to clients of a communication network via an online storefront or library, for example. In at least some implementations, the application program management service may execute an instance of a target application program at a test bench that simulates a client. In other implementations, the application program management service may utilize test result data and/or test parameter data obtained from one or more clients of the communication network to evaluate the health of the application programs. Implementations for obtaining test result data and/or test parameter data from clients are disclosed. Application program health values may be associated with application programs to enable filtering of the application programs and publication of the application program health values.

Figure 1:
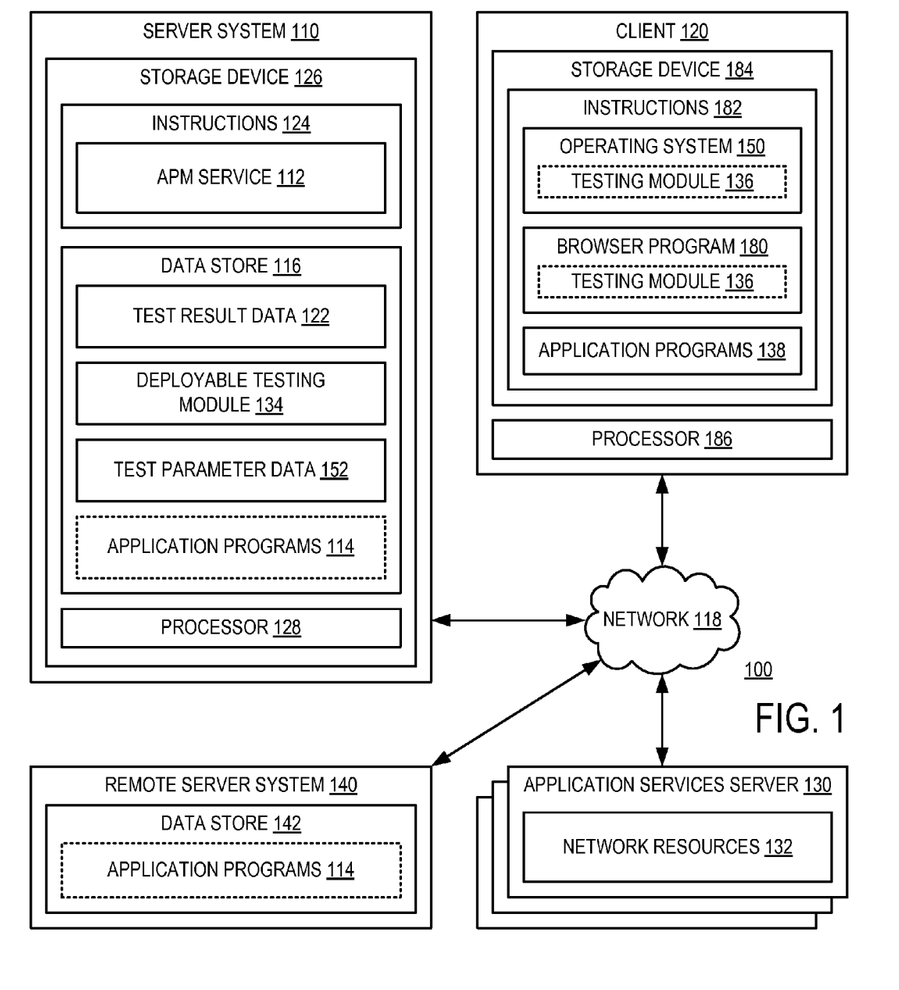
FIG. 1 is a schematic diagram depicting an example network communications system according to one disclosed embodiment.

FIG. 1 is a schematic diagram depicting an example network communications system 100 according to one disclosed embodiment. Network communications system 100 may include a server system 110. Server system 110 may include one or more server devices for executing an application program management service 112. Application program management service 112 may be implemented as instructions 124 stored at storage device 126 (e.g., mass storage, memory, etc.) that are executable by a processor 128 of server system 110. The term 'server system' is used herein to denote both individual server implementations and multiple server implementations where functional aspects of server system 110 may be distributed across any suitable number of servers connected via communication network 118.

Application program management service 112 may be configured to identify one or more networked components of a target application program. A target application program may be one of a plurality of application programs 114 accessible by clients at application program data store 116 of server system 110 or application program data store 142 of remote server system via communication network 118. Communication network 118 may comprise one or more of a local area network or a wide area network such as the Internet, for example. An example client 120 is depicted in FIG. 1. Client 120 refers to a client device such as a mobile device, personal computer, or other suitable electronic device that may be operated by a human user.

In at least some implementations, the one or more networked components of the target application program may include one or more respective network resources. A network resource may comprise any suitable element of information that may be accessed by an application program over a communication network. Each network resource may be referenced by the target application program via a corresponding hyperlink (e.g., referring to a network address of the network resource) or an application programming interface. For example, the one or more networked components of a target application program may refer to one or more network resources 132 residing at an application services server 130. An instance of an application program that is executed at client 120 or at server system 110 may request network resources 132, and may receive responses to such requests from applications services server 130. An application program that is unable to obtain suitable access to network resources may suffer degraded operation or performance due to the unavailability of the network resources.

Application program management service 112 may be configured to test the one or more networked components of a target application program, and associate an indication of a result of the test with the target application program, for example, at application program data store 116 or application program data store 142. In FIG. 1, the result of the test may correspond to the depicted test result data 122.

In at least some implementations, application program management service 112 may be configured to identify the one or more networked components of the target application program by executing an instance of the target application program. For example, application program management service 112 may execute an instance of a target application program, and may traverse or attempt to traverse each hyperlink (e.g., of a graphical user interface) or application programming interface of the target application in an attempt to access respective networked components of the target application program. Application program management service 112 may be configured to send requests to each networked component of the target application program, and monitor response traffic for success messages (e.g., an HTTP 200 OK message) or error messages (e.g., an HTTP 404 Not Found message) received in response to such requests.

Application program management service 112 may be configured to output, for example, by presenting an indication of a result of the test, or transmitting the indication of the result of the test to one or more clients via communication network 118 for presentation at the one or more clients, or otherwise publishing the indication of the result of the test to a network location accessible by one or more clients via communication network 118. The sharing of the results of the tests among clients may enable consumers to make more informed decisions regarding purchasing or acquiring such application programs, and may enable administrators of online storefronts or libraries to exclude application programs that have failed the tests.

In at least some implementations, application program management service 112 may be configured to filter a target application program relative to the plurality of application programs 114 of application program data store 116 based, at least in part, on the indication of the result of the test associated with the target application program. As one example, application program management service 112 may be configured to filter the plurality of application programs 114 of the application program data store 116 to obtain a subset of acceptable application programs from the plurality of application programs of the application program data store. The acceptable application programs may have at least a threshold ratio of success responses relative to error responses. Application program management service 112 may be configured to exclude one or more application programs not included in the subset of acceptable application programs from being accessed by requesting clients over the communication network, or may otherwise reduce availability of the application programs not included in the subset of acceptable application programs.

In at least some implementations, application program management service 112 may be configured to test the networked component of the target application program by applying an automated test framework of a test harness program to the target application program, and may be configured to receive the result of the test from the test harness program. The test harness program may provide a test bench that simulates a client of communication network 118. However, in other implementations, application program management service 112 may be configured to deploy a test harness program such as deployable testing module 134 to a client having an instance of the target application program via the communication network to cause the client to execute the instance of the target application program, identify the networked component of the target application program, and test the networked component of the target application program.

For example, application program management service 112 is depicted with deployable testing module 134, and client 120 is depicted with testing module 136 that may correspond to an instance of deployable testing module 134. In this implementation, the test harness program (e.g., testing module 136) may be executable by client 120 to send a response from client 120 to server system 110 via communication network 118 that includes the indication of the result of the test performed by the client. In at least some implementations, testing module 136 may form part of operating system 150 or browser program 180 of client 120. As previously described, testing module 136 may be deployed to client 120 by server system 110 in at least some implementations. As one example, testing module 136 may be provided as a plug-in, or other suitable set of instructions that are executable by client 120. A processor 186 of client 120 may execute instructions 182 held in storage device 184, including testing module 136 and application programs 138.

In at least some implementations, application program management service 112 may be configured to, for each application program of the plurality of application programs 114 including at least the target application program: identify the one or more networked components of the application program by executing an instance of the application program; test the one or more networked components of the application program; and associate an indication of a result of the test with the application program (e.g., as test result data 122). In at least some implementations, application program management service 112 may be configured to rank the plurality of application programs 114 based, at least in part, on the respective indication associated with each application program of the plurality of application programs 114. The rank of the plurality of application programs may be presented to a user via browser program 180 of client 120, for example.

In at least some implementations, test result data may be obtained from clients. For example, testing module 136 of client 120 may be configured to monitor response traffic received at client 120 via communication network 118 that are responsive to respective requests made by one or more application programs 138 executed at client 120. Testing module 136 may be configured to, for a given response message of the response traffic, associate an indication of whether the response message includes an error message or a success message with an application program identifier corresponding to a target application program of the plurality of application programs. Testing module 136 may be configured to send a reporting message from client 120 to server system 110 via communication network 118. The reporting message may include an application program identifier for the target application program, and may include the indication of whether the response message includes an error message or a success message. In at least some implementations, the reporting message may further include an indication or identifier of a networked component corresponding to the response message. The networked component may include a network resource referenced by the target application program via a corresponding hyperlink or an application programming interface, for example.

In at least some implementations, testing module 136 may be configured to send the reporting message from client 120 to server system 110 via communication network 118 responsive to client 120 registering with an application program storefront or library provided by the server system 110. As one example, application program management service 112 may require that testing module 136 provide test result data to server system 110 in order to gain access to an online storefront or library for application program data store 116, or may provide increased functionality to clients within the online storefront or library in response to the clients providing test result data to server system 110.

Application program management service 112 may be configured to receive the reporting message from client 120 at server system 110. Test result data of the reporting message may be stored as server system 110 as depicted by test result data 122. In at least some implementations, application program management service 112 may be configured to combine the indication of whether the response message includes an error message or a success message with other indications associated with the application program identifier received from client 120 or other clients via communication network 118 to obtain a combined application program health value for the target application program corresponding to the application program identifier. Application program management service 112 may be configured to present an indication of the combined application program health value, or transmit the indication of the combined application program health value from server system 110 to one or more clients (e.g., another client) via communication network 118 for presentation, or publish the indication of the combined application program health value to a network location accessible by one or more clients (e.g., one or more other clients) via communication network 118. The sharing of application program health values with other clients may enable users to make more informed decisions regarding purchasing or acquiring application programs.

In at least some implementations, testing module 136 may be configured to combine at client 120, the indication of whether the response message includes an error message or a success message with one or more other indications associated with the application program identifier of whether one or more other response messages of the response traffic include an error message or success message. In these implementations, testing module 136 may be configured to send the reporting message from client 120 to server system 110 via communication network 118 by sending the combination of the indication and the one or more other indications from client 120 to server system 110 via communication network 118.

In at least some implementations, test result data and/or test parameter data may be obtained from clients. Test parameter data may enable server system 110 to independently obtain test result data for a target application program residing at a client. For example, testing module 136 may be configured to identify one or more networked components of each of a plurality of application programs residing at client 120. Each networked component may have a corresponding network address and testing code. The testing code may be obtained by testing module 136 from network resources 132 of application services server 130 via communication network 118 or may be generated by testing module 136 from information contained within the target application program.

Testing module 136 may be configured to send a test parameter message containing test parameter data from client 120 to server system 110 via communication network 118. The test parameter message may include one or more network addresses and one or more testing codes corresponding to the one or more networked components of a target application program of the plurality of application programs 138, and may further include an application program identifier for the target application program. An example of test parameter data received from client 120 is depicted at server system 110 as test parameter data 152.

In at least some implementations, testing module 136 may be configured to send a test parameter message from client 120 to server system 110 via communication network 118 responsive to client 120 registering with an application program storefront or library provided by the server system 110. As one example, application program management service 112 may require that testing module 136 provide a test parameter data to server system 110 in order to gain access to an online storefront or library for application program data store 116, or may provide increased functionality to clients within the online storefront or library in response to the clients providing test parameter data to server system 110.

Application program management service 112 may be configured to receive the test parameter message at server system 110 via communication network 118. Application program management service 112 may be configured to send one or more request messages including the one or more testing codes from server system 110 via communication network 118 to one or more network addresses corresponding to the one or more networked components. For example, application program management service 112 may be configured to send one or more testing codes to network resources 132 of application services server 130. Server system 110 may simulate a client requesting network resources for a target application. Application program management service 112 may be configured to monitor response traffic received at server system 110 via communication network 118 responsive to the one or more request messages. Application program management service 112 may be configured to, for a response message of the response traffic, associate an indication of whether the response message includes a success message or an error message with the application program identifier for the target application program.

As previously described, application program management service 112 may be configured to combine two or more indications of whether response messages include error messages or success messages to obtain a combined application program health value for the target application program corresponding to the application program identifier. Application program management service 112 may be configured to filter the target application program relative to other application programs based, at least in part, on the combined application program health value as previously described. Application program management service 112 may be configured to present an indication of the combined application program health value, or transmit the indication of the combined application program health value from server system 110 to another client via communication network 118 for presentation at the another client, or publish the indication of the combined application program health value to a network location accessible by one or more other clients via communication network 118. Again, the sharing of application program health values with other clients may enable users to make more informed decisions regarding purchasing or acquiring application programs. Application program management service 112 may be configured to periodically test networked components of a target application program according to any suitable testing schedule.

Figure 2:
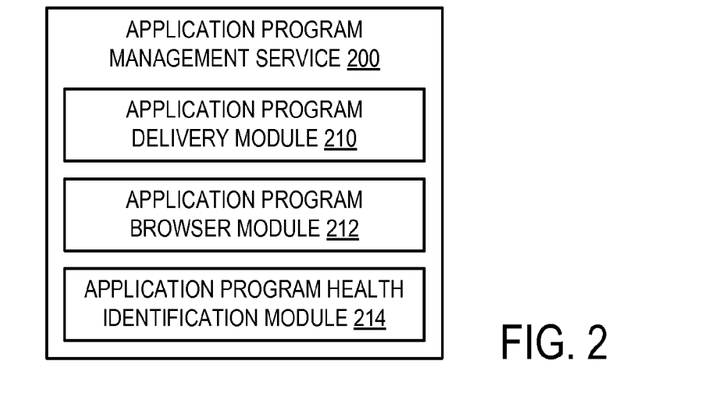
FIG. 2 is a schematic diagram depicting an example application program management service.

FIG. 2 is a schematic diagram depicting an example application program management service 200. Application program management service 200 is a non-limiting example of previously described application program management service 112 of FIG. 1. Application program management service 200 may include one or more of an application program delivery module 210, an application program browser module 212, and an application program health identification module 214.

Application program browser module 212 may be configured to expose information associated with the plurality of application programs of an application program data store to browser programs (e.g., browser program 180) residing at the clients. For example, a user may operate a browser program of a client to request information relating to an application program, or to request purchase or download of an application program via application program browser module 212.

Application program delivery module 210 may be configured to receive and respond to requests for a plurality of application programs of an application program data store (e.g., application program data store 116) from a plurality of clients via a communication network. For example, application program browser module 212 may be configured to pass requests for an application program to application program delivery module 210 once a client has purchased the application program. Application program delivery module 210 may be configured to send an instance of the application program to the client via a communication network.

Application program health identification module 214 may be configured to identify the one or more networked components of a target application program, test the one or more networked components, and associate the indication of a result of the test with the target application program at the application program data store accessible by the clients via the communication network as previously described. Application program health indication module 214 may be further configured to obtain test parameter data and/or test result data from clients as previously described.

Figure 3:
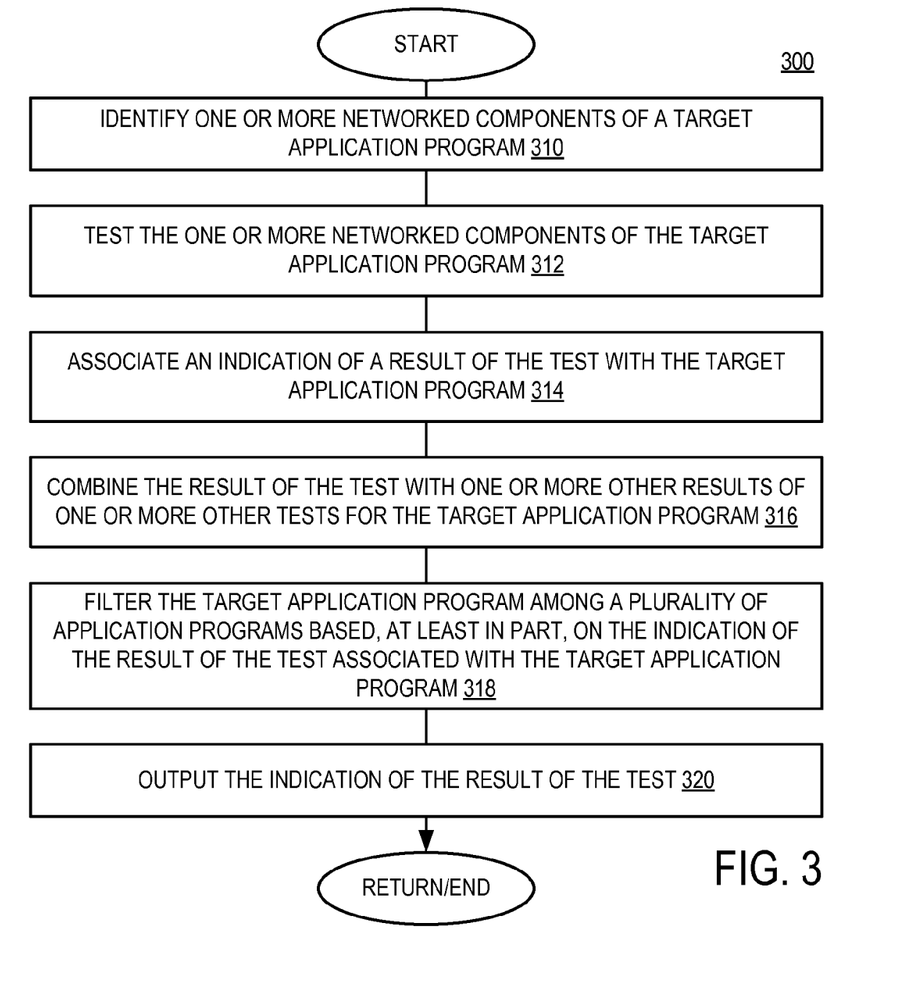
FIG. 3 is a flow diagram depicting an example application program testing method according to one disclosed embodiment.

FIG. 3 is a flow diagram depicting an example application program testing method 300 according to one disclosed embodiment. Method 300 may be implemented by a server system without necessarily requiring that the server system receive test result data or test parameter data from clients. By contrast, methods 400 and 500 of FIGS. 4 and 5 may be implemented by a server system that receives test result data or test parameter data from clients via a communication network.

At 310, the method may include identifying one or more networked components of a target application program. For example, an instance of the target application program may be executed (e.g., by an application program health identification module of the server system) to identify the one or more networked components of the target application program. As previously described, a networked component may include a network resource referenced by the target application program via a corresponding hyperlink or an application programming interface as previously described with reference to FIG. 1.

At 312, the method may include testing the one or more networked components of the target application program. For example, the one or more networked components may be tested by sending a request message to each networked component of the target application and monitoring response traffic to identify whether a response message received from a networked component includes a success message (e.g., an HTTP 200 OK message) or an error message (e.g., an HTTP 404 Not Found) responsive to the request message. A response message may be received from each networked component in some scenarios. In at least some implementations, testing the one or more networked components may include applying an automated test framework of a test harness program to the target application program, and receiving the result from the test harness program.

In at least some implementations, a result of a test of a target application program may comprise one or more values corresponding to the response message received from each of the one or more networked components of the target application program. For example, a target application program that includes seven networked components may have a test result that comprises seven values. Each value of the test result may indicate whether a response message that was received in response to a request for a networked element of the target application program included a success message or an error message. Two or more values of a test result may be combined in any suitable manner to provide a test result having a combined value that is indicative of the individual values of the networked components that were tested.

At 314, the method may include associating an indication of the result of the test with the target application program. For example, the indication of the result of the test may be stored in a data store associated with an identifier of the target application program. An indication of a result of a test of a target application program may be referred to as an application program health value.

At 316, the method may include combining the result of the test with one or more other results of one or more other tests performed for the target application program. For example, the method at 312 may be periodically performed to test the one or more networked components of the target application program according to a testing schedule to measure the health of the target application program over time. A combination of two or more results of two or more tests performed for a target application program may be referred to herein as a combined application program health value. Two or more test results may be combined in any suitable manner utilizing the same or different weightings among the combined test results. As one example, a combined application program health value may comprise an average or median of a number of individual test results for the target application program. As another example, more recently obtained test results may be weighted more than less recently obtained test results. The combined application program health value may be associated with target application program, for example, as previously described with reference to the method at 314 for an individual test result.

At 318, the method may include filtering the target application program among a plurality of application programs based, at least in part, on the indication of the result of the test associated with the target application program. Each application program may have a respective indication of a result of a test (e.g., an application program health value) or a combined application program health value for the application program.

At 320, the method may include outputting the indication of the result of the test of the target application program. Outputting the indication of the result of the test may include presenting the indication of the result of the test, or transmitting the indication of the result of the test to a client via a communication network for presentation at the client, or publishing the indication of the result of the test to a network location accessible by one or more clients via a communication network. The sharing of test result data among clients may enable users to make more informed decisions regarding purchasing or acquiring an application program.

Figure 4:
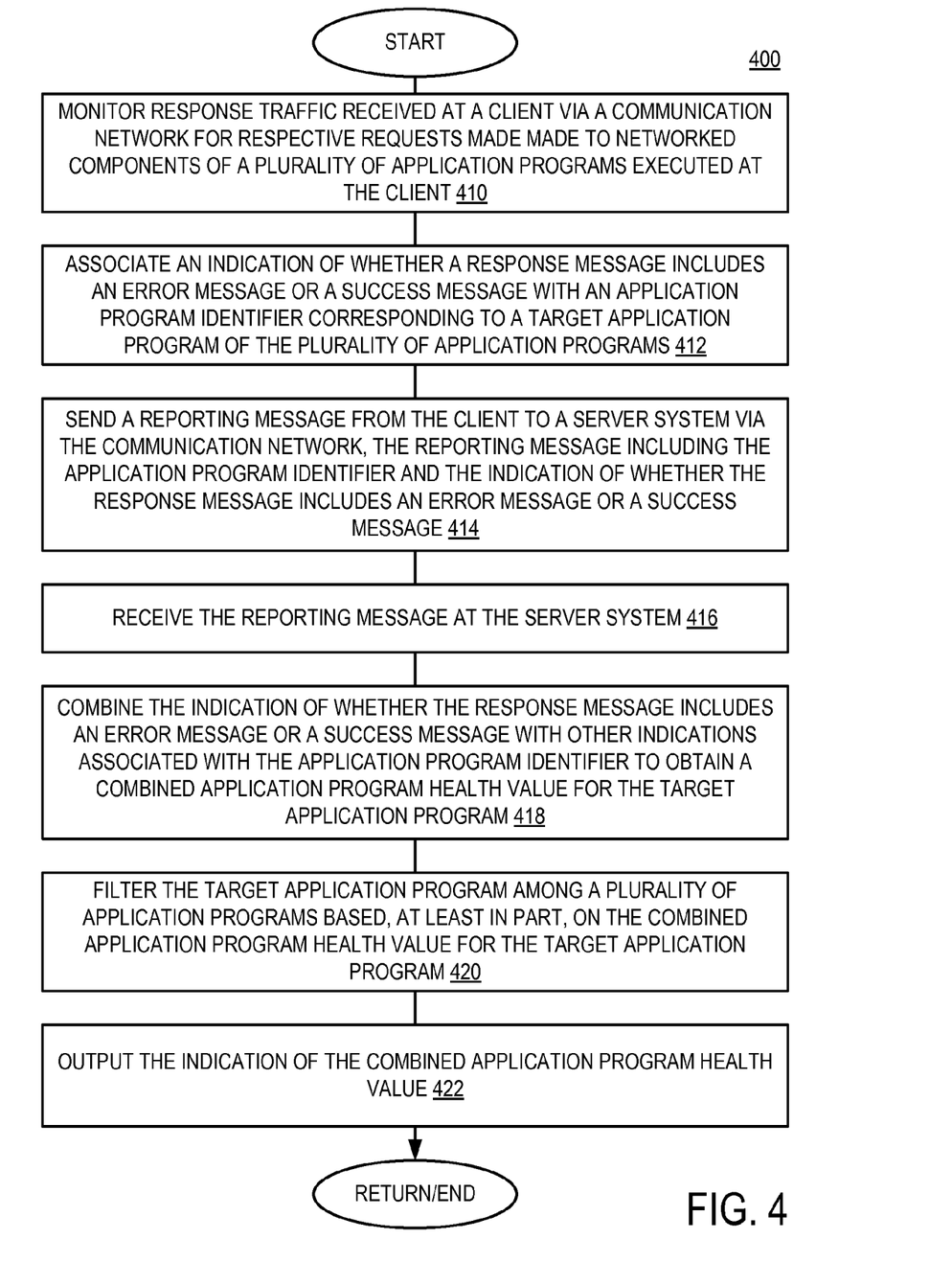
FIG. 4 is a flow diagram depicting another example application program testing method according to one disclosed embodiment.

FIG. 4 is a flow diagram depicting another example application program testing method 400 according to one disclosed embodiment. Method 400 may be performed in part by a client to obtain test result data on behalf of a server system as described, for example, at operations 410-414. The server system may utilize the test result data obtained from the client in a number of ways as described, for example, by operations 416-422.

At 410, the method may include monitoring response traffic received at a client via a communication network for respective requests made to networked components of a plurality of application programs executed at the client. At 412, the method may include, for a response message of the response traffic, associating an indication of whether the response message includes an error message or a success message with an application program identifier corresponding to a target application program of the plurality of application programs.

The indication of whether the response message includes an error message or a success message may be referred to as the test result or application program health value in the context of method 400. As previously described, a target application program may have any suitable number of networked components. In at least some implementations, the reporting message may further include an indication of a networked component corresponding to the response message and/or an application program identifier for the application program of the networked component. In at least some implementations, sending the reporting message from the client to the server system at operation 412 may be performed by the client responsive to the client registering with an application program storefront or library provided by the server system.

At 414, the method may include, sending a reporting message from the client to a server system via the communication network. The reporting message may include the application program identifier and the indication of whether the response message includes an error message or a success message. In at least some implementations, the method at the client may further include combining the indication of whether the response message includes an error message or a success message with one or more other indications associated with the application program identifier of whether one or more other response messages of the response traffic include an error message or success message. In this implementation, the method at 414 may include sending the reporting message from the client to the server system via the communication network that includes the combination of the indication and the one or more other indications.

At 416, the method may include, receiving the reporting message at the server system. At 418, the method may include, combining the indication of whether the response message includes an error message or a success message with other indications associated with the application program identifier received from the client or other clients devices via the communication network to obtain a combined application program health value for the target application program corresponding to the application program identifier. At 420, the method may include filtering the target application program relative to the plurality of application programs of the application program data store based, at least in part, on the combined application program health value for the target application program. At 422, the method may include, outputting the indication of the combined application program health value. For example, outputting the indication may include presenting the indication of the combined application program health value, or transmitting the indication of the combined application program health value from the server system to another client for presentation at the another client, or publishing the indication of the combined application program health value to a network location accessible by one or more other clients via the communication network.

Figure 5:
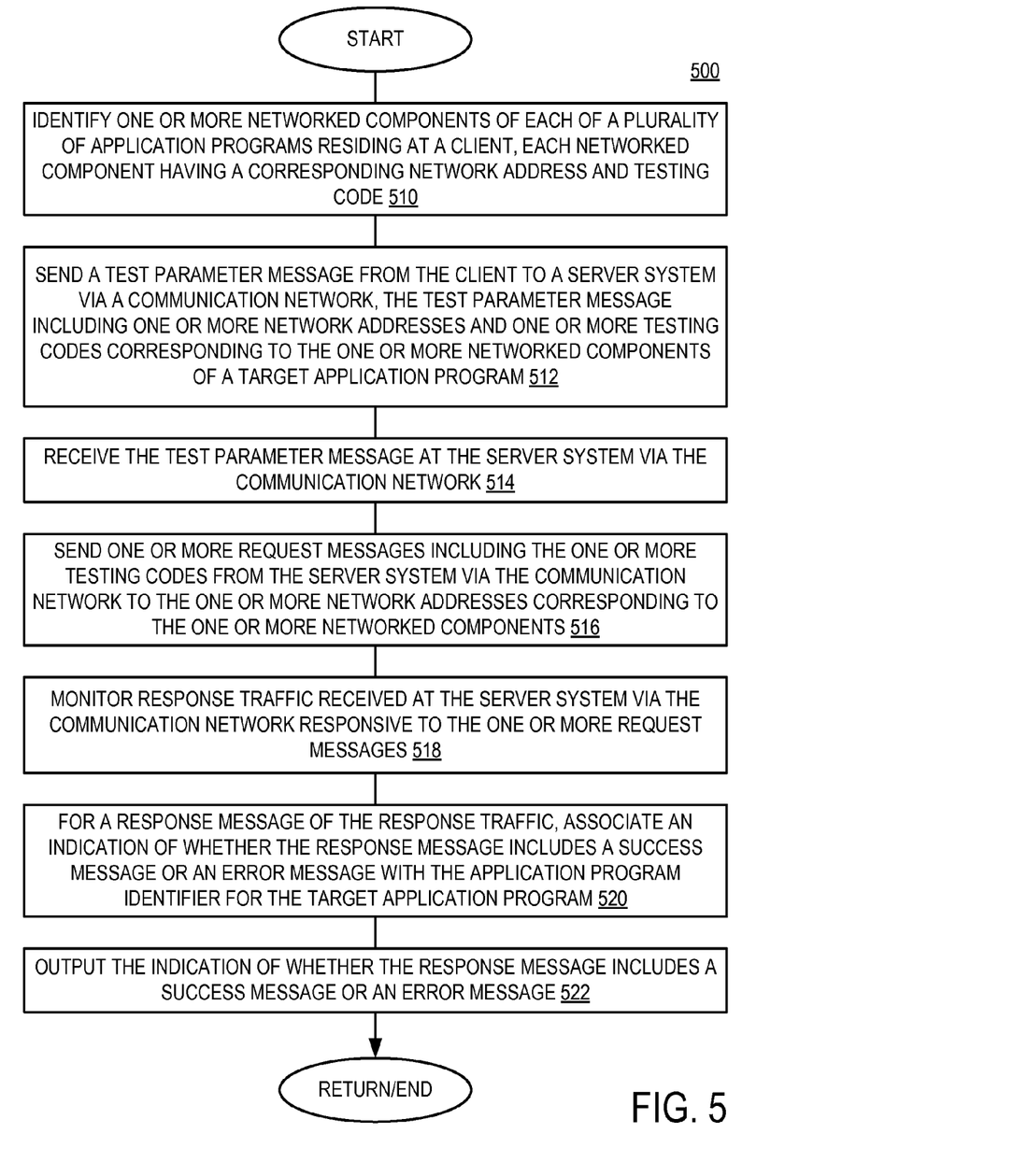
FIG. 5 is a flow diagram depicting yet another example application program testing method according to one disclosed embodiment.

FIG. 5 is a flow diagram depicting yet another example application program testing method 500 according to one disclosed embodiment. Method 500 may be performed in part by, for example, a client to obtain test parameter data on behalf of a server system as described, for example, at operations 510-512. The server system may utilize the test result data obtained from the client in a number of ways as described, for example, by operations 514-520.

At 510, the method may include identifying one or more networked components of each of a plurality of application programs residing at a client. Each networked component may have a corresponding network address and testing code, and each application program may have one or more networked components. In at least some implementations, a network address and testing code for a networked component of a target application program may be specified within or may be derived from the instructions that comprise the target application program. In other implementations, the client may receive testing codes from each of the networked components in response to requests sent by the client to the network addresses of networked components.

At 512, the method may include sending a test parameter message from the client to a server system via a communication network. The test parameter message may include one or more network addresses, and one or more testing codes corresponding to the one or more networked components of a target application program. In at least some implementations, the test parameter message may further include an application program identifier for the target application program.

At 514, the method may include receiving the test parameter message at the server system via the communication network. Test parameter data of the test parameter message may be associated with the program indication by the application program identifier. At 516, the method may include sending one or more request messages including the one or more testing codes from the server system via the communication network to the one or more network addresses corresponding to the one or more networked components. At 518, the method may include monitoring response traffic received at the server system via the communication network responsive to the one or more request messages. At 520, the method may include, for a response message of the response traffic, associating an indication of whether the response message includes a success message or an error message with the application program identifier for the target application program. At 522, the method may include outputting the indication of whether the response message includes a success message or an error message.

The indication of whether the response message includes a success message or an error message may comprise an application program health value, and may be combined with other indications of other response messages to obtain combined application program health values as previously described with reference to method 400 of FIG. 4. Combined application program health values may be associated with a target application program. Furthermore, filtering of a target application programs relative to other application programs may be performed based, at least in part, on the application program health value or a combined application program health value associated with the target application program as previously described with reference to method 400. For example, a fail threshold may be applied to an application program health value or combined application health value to determine whether the target application program should be excluded from being made available to clients of an application program data store.

Figure 6:
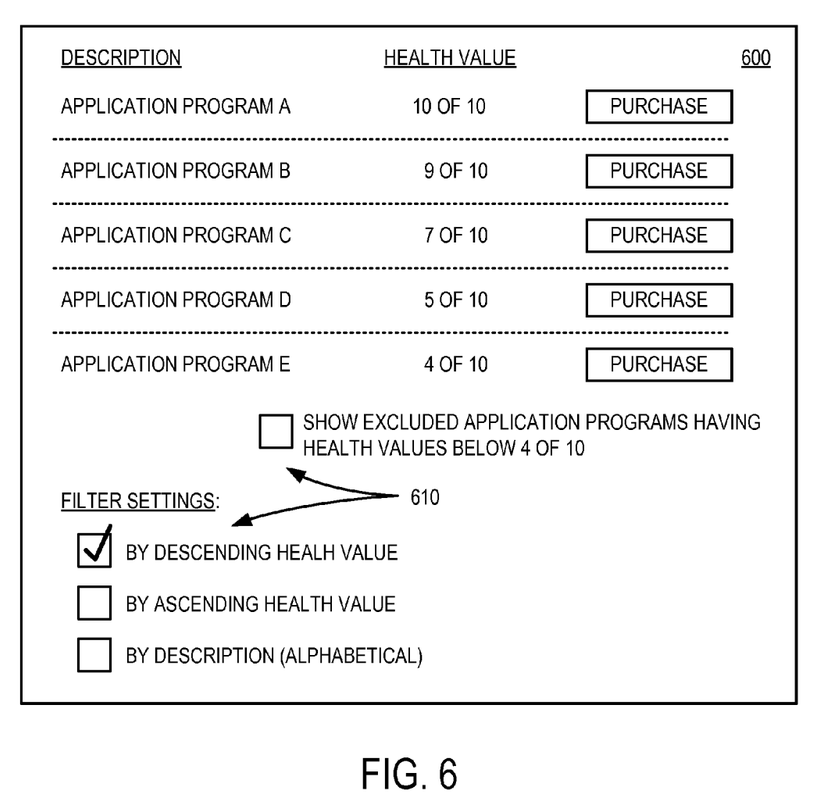
FIG. 6 is a schematic diagram depicting an example graphical user interface of a browser program according to one disclosed embodiment.

FIG. 6 is a schematic diagram depicting an example graphical user interface (GUI) 600 of a browser program according to one disclosed embodiment. As previously discussed with reference to FIG. 1, browser program 180 of a client may be operated by a user to request and receive information associated with application programs of an application program data store. GUI 600 includes some example information that may be associated with a plurality of application programs such as, for example, an application program description and a respective application program health value. The application program health values presented via GUI 600 may include individual or combined application program health values obtained using one or more of the methods of FIGS. 3, 4, and 5, or combinations thereof.

GUI 600 includes a number of control elements 610 to enable a user to vary filter criteria that is applied to application programs of the application program data store by the browser program residing at the client or by an application program browser module residing at the server system that performed the testing of the application programs or at another suitable remote server system. In FIG. 6, the applied filter orders the application programs by descending health value. In this example, Application Program A is associated with an application program health value of 10 of 10. By contrast, Application Program E is associated with an application program health value of 4 of 10, which may correspond, for example, to a lower ratio of success messages to error messages than Application Program A.

A user may reorder the application programs presented via GUI 600 by changing the filter settings (e.g., via control elements 610) that are applied to the information by the browser program or by the application program browser module. In this example, application programs of the application program data store that are associated with an application program health value that is less than a threshold (e.g., 4 of 10) have been excluded by the browser program or by the application program browser module from presentation via GUI 600. A user may access excluded application programs, for example, by changing or removing the threshold that is applied via control elements 610.

In at least some implementations, the health values or other indications of the result of the tests conducted for each application program may not be presented or otherwise published for the benefit of consumer type users. Rather, application programs meeting at least an acceptable health value may be presented or published for purchase, download, or access while application programs having an unacceptable health value may be excluded from purchase, download, or access by users without presenting the health values associated with each application program. In either scenario, a user with knowledge of the relative health value associated with each application program may purchase, download, or otherwise access one or more of the application programs via GUI 600, for example, by selecting a corresponding control element. In this way, a user may discriminate among application programs within an online storefront or library on the basis of the health value associated with the application program.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A server system, comprising:
   a storage device having executable instructions stored thereon defining an application program management service, and
   a processor to execute the instructions to implement the application program management service to:
   execute an instance of a target application program at the server system to identify one or more networked components of the target application program, the target application program being one of a plurality of application programs accessible at an online storefront of an application program data store from which consumers purchase and download application programs developed by developers to client devices via a communication network;
   test the one or more networked components of the target application program for success responses or error responses;
   filter the plurality of application programs based, at least in part, on a result of the test to obtain a subset of acceptable application programs from the plurality of application programs, each of the acceptable application programs having at least a threshold ratio of success responses relative to error responses;
   exclude one or more application programs not included in the subset of acceptable application programs from being accessible at the online storefront by requesting client devices over the communication network at least for consumers that have not yet purchased the one or more excluded application programs; and
   provide information to a client device via the communication network to cause the client device to display the online storefront via a graphical user interface that includes a plurality of selectors to purchase the subset of acceptable application programs not yet purchased by a consumer operating the client device for download to the client device, and that does not include selectors to purchase the one or more excluded application programs that were filtered out and not included in the subset of acceptable application programs.

2. The server system of claim 1, wherein the instructions defining the application program management service are further executable by the processor to:
   present the indication of the result of the test, or transmit the indication of the result of the test to one or more client devices via the communication network for presentation at the client devices, or publish the indication of the result of the test to a network location accessible by one or more of the client devices via the communication network.

3. The server system of claim 1,
   wherein the one or more networked components include one or more network resources each referenced by the target application program via a corresponding hyperlink or an application programming interface.

4. The server system of claim 1, wherein,
   the application program management service includes:
   an application program delivery module executable by the processor to receive and respond to requests for the plurality of application programs from the client devices via the communication network;
   an application program browser module executable by the processor to expose information associated with the plurality of application programs accessible at the online storefront of the application program data store to browser programs residing at the client devices; and
   an application program health identification module executable by the processor to identify the one or more networked components, test the one or more networked components, and associate the indication of a result of the test with the target application program accessible at the online storefront of the application program data store via the communication network.

5. The server system of claim 1, wherein the instructions defining the application program management service are further executable by the processor to test the networked component of the target application program by:
applying an automated test framework of a test harness program to the target application program at the server system, and receiving the result from the test harness program; and
traversing one or more hyperlinks of a graphical user interface of the target application program to the networked component, and identifying a response from the networked component.

6. The server system of claim 1, wherein the instructions defining the application program management service are further executable by the processor to:
for each application program of the plurality of application programs accessible at the online storefront of the application program data store including at least the target application program:
identify one or more networked components of the application program by executing an instance of the application program at the server system;
test the one or more networked components of the application program;
associate an indication of a result of the test with the application program; and
rank the plurality of application programs based, at least in part, on the respective indication associated with each application program of the plurality of application programs.

7. The server system of claim 1, wherein the instructions defining the application program management service are further executable by the processor to periodically test the one or more networked components of the target application program according to a testing schedule.

8. An application program testing method, comprising:
monitoring response traffic received at a client device via a communication network for respective requests made to networked components of a plurality of application programs executed at the client device;
for a response message of the response traffic, associating an indication of whether the response message includes an error message or a success message with an application program identifier corresponding to a target application program of the plurality of application programs;
sending a reporting message from the client device to a server system via the communication network responsive to the client device registering with an application program storefront provided by the server system, the reporting message including the application program identifier and the indication of whether the response message includes an error message or a success message; and
provide information to another client device via the communication network to cause the another client device to display the application program storefront via a graphical user interface that includes a plurality of selectors to purchase acceptable application programs not yet purchased by a consumer operating the another client device for download to the another client device, each of the acceptable application programs having at least a threshold ratio of success messages relative to error messages, and the graphical user interface does not include selectors to purchase application programs that do not have at least the threshold ratio of success messages relative to error messages to thereby exclude application programs that do not have at least the threshold ratio.

9. The method of claim 8, further comprising:
receiving the reporting message at the server system; and
combining the indication of whether the response message includes an error message or a success message with other indications associated with the application program identifier received from the client device or other client devices via the communication network to obtain a combined application program health value for the target application program corresponding to the application program identifier.

10. The method of claim 9, further comprising:
presenting an indication of the combined application program health value, or transmit the indication of the combined application program health value from the server system to the another client device for presentation at the another client, or publish the indication of the combined application program health value to a network location accessible by one or more other clients devices via the communication network.

11. The method of claim 9, further comprising:
filtering the target application program relative to the plurality of application programs of the application program data store based, at least in part, on the combined application program health value for the target application program.

12. The method of claim 8, further comprising:
combining at the client device, the indication of whether the response message includes an error message or a success message with one or more other indications associated with the application program identifier of whether one or more other response messages of the response traffic include an error message or success message;
wherein sending the reporting message from the client device to the server system via the communication network further includes sending the combination of the indication and the one or more other indications from the client device to the server system via the communication network.

13. The method of claim 8, wherein the reporting message further includes an indication of a networked component corresponding to the response message, the networked component including a network resource referenced by the target application program via a corresponding hyperlink or an application programming interface.

14. The method of claim 8, wherein said monitoring, said associating, and said sending the reporting message is performed by a testing module of an operating system of the client device or a testing module of a browser program of the client device.

15. A method implemented by a server system, comprising:
executing an instance of a target application program at a server system to identify one or more networked components of the target application program, the target application program being one of a plurality of application programs accessible at an online storefront of an application program data store from which consumers, that have not yet purchased the application programs, purchase and download application programs developed by developers to client devices via a communication network;

testing the one or more networked components of the target application program for success responses or error responses;

outputting an indication of a result of the test of the target application program by publishing the indication of the result of the test to a network location accessible by one or more of the client devices via the communication network; and provide information to a client device via the communication network to cause the client device to display the online storefront via a graphical user interface that includes a selector to enable a consumer operating the client device, and which has not yet purchased the target application program, to purchase the target application program for download to the client device if the target application program has at least a threshold ratio of success responses relative to error responses, and the graphical user interface does not include a selector to purchase the target application program if the target application program does not have at least the threshold ratio of success responses relative to error responses to thereby exclude application programs that do not have at least the threshold ratio.

16. The method of claim 15, further comprising:

filtering the plurality of application programs based, at least in part, on a result of the test to obtain a subset of acceptable application programs from the plurality of application programs; and excluding one or more application programs not included in acceptable application programs from being accessible at the online storefront by requesting client devices over the communication network at least for consumers that have not yet purchased the excluded application programs.

* * * * *